UNITED STATES PATENT OFFICE.

HELMUTH HERMANN WÜNSCHE, OF KIRCHSTEINBEK, NEAR HAMBURG, GERMANY, ASSIGNOR TO THE FIRM OF PEARSON & CO., GESELLSCHAFT MIT BESCHRÄNKTER HAFTUNG, OF HAMBURG, GERMANY.

STABLE MIXTURE CONTAINING PERBORATES.

1,105,739. Specification of Letters Patent. Patented Aug. 4, 1914.

No Drawing. Application filed February 6, 1912. Serial No. 675,871.

*To all whom it may concern:*

Be it known that I, HELMUTH HERMANN WÜNSCHE, a subject of the Emperor of Germany, and resident of Kirchsteinbek, near Hamburg, in the German Empire, have invented a certain new and useful Stable Mixture Containing Perborates, of which the following is a specification.

For disinfecting the mouth, chiefly such materials are used which yield oxygen when in contact with the mucous membranes, such as peroxid of hydrogen, peroxids and perborates. By decomposing the perborate in such dentifrices and disinfectants with an acid immediately before using them, peroxid of hydrogen is obtained; therefore, tablets containing perborates and some dry acid, such as tartaric acid or a citrate, and yielding peroxid of hydrogen when dissolved in water, would be very convenient for use. Such mixtures, however, are not stable, the water of crystallization decomposing them after a short time. According to this invention such tablets can be rendered durable by adding a bi-carbonate to the mixture of a perborate and dry acid or acid salts. For example, by mixing 100 parts of sodium bi-carbonate with 50 parts of commercial perborate of sodium which contains from 2 to 4 molecules of water of crystallization, and 100 parts of sodium carbonate with 50 parts of tartaric acid, and then mixing these two powders, a stable powder is obtained from which stable tablets can be pressed. This fact is the more surprising because sodium bi-carbonate, an acid salt, is not an indifferent medium in relation to perborate and tartaric acid. By adding water to this mixture, an alkaline solution of peroxid of hydrogen is obtained.

I claim—

1. The hereindescribed new solid stable mixtures of perborates containing water of crystallization, a solid acid substance and a bi-carbonate, which mixtures yield hydrogen peroxid when treated with water.

2. The hereindescribed new, solid, stable mixtures of perborates containing water of crystallization, a solid acid substance and bi-carbonate of sodium, which mixtures yield hydrogen peroxid when treated with water.

3. The hereindescribed new, solid, stable mixtures of crystalline perborates, a dry solid acid, and a carbonate, yielding when treated with water, peroxid of hydrogen.

4. The herein described new stable mixtures of crystalline per-borates, a carbonate and a dry solid acid substance capable when wetted of liberating peroxid of hydrogen from the perborates and carbonic acid from the carbonate.

HELMUTH HERMANN WÜNSCHE.

Witnesses:
MAX F. A. KAEMPFF,
ERNEST H. L. MUMMENHOFF.